3,211,580
PROCESS FOR THE TREATMENT OF MATERIALS WITH SILICONES
Werner Langmann, Cologne-Flittard, Wolfgang Lehmann, Leverkusen, Walter Wunder, Cologne-Flittard, and Oskar Glenz, Cologne-Stammheim, Germany, assignors to Farbenfabriken Bayer Aktiengesellschaft, Leverkusen, Germany, a corporation of Germany
No Drawing. Filed Nov. 17, 1960, Ser. No. 69,842
Claims priority, application Germany, Nov. 21, 1959, F 29,898; July 30, 1960, F 31,812
6 Claims. (Cl. 117—161)

The present invention relates to the treatment of materials with silicones; more particularly it concerns a process which consists in treating materials with silicones and reaction products obtained by the action of epoxide resins on di- and/or polyamines.

The process according to the invention can be carried out by first treating the materials with the reaction products and then with the silicones; however, it is also possible to apply the reaction products at the same time as the silicones.

The reaction products are preferably employed in the form of solutions or emulsions in water or organic solvents. The silicones may also be employed in the form of solutions or emulsions in water or organic solvents, but may also be used as such. The proportion of the reaction products and of the silicones can vary within wide limits; suitable proportions can readily be determined by preliminary experiments; in general, the useful proportion is about 1:1.

The reaction products can be prepared by various methods. Particularly suitable are the products which are obtained when epoxide resins, for instance, the reaction product from 1 mol of 2,2-bis-(p-hydroxyphenyl)-propane and 2 mols of epichlorhydrin are reacted with di- and/or polyamines containing at least two reactive hydrogen atoms, e.g., with ethylene diamine, tetramethylene diamine, diethylene triamine, triethylene tetramine, tetraethylene pentamine, dipropylene, triamine, $\gamma,\gamma'$-diaminopropylmethylamine, and piperazine, in proportions such that 1 to 3 epoxide groups are employed for each reactive hydrogen atom of the amine; a process for the production of such products has been described, e.g., in copending application Serial No. 67,169, filed November 4, 1960. The reaction products are preferably employed in the form of salts of readily volatile organic acids, in aqueous solution.

As silicones, there may be considered alkyl-hydrogen-polysiloxanes and dialkyl-polysiloxanes, as described, e.g., in Rochow, "Chemistry of the Silicones" (2nd Edition, 1951), and in German Patent No. 925,225; when dialkyl polysiloxanes are employed, it is recommended to admix alkyl-hydrogen-polysiloxanes. Where necessary, it is possible to employ the usual catalysts, such as zinc and titanium compounds, to accelerate the hardening of the silicones.

The treatment according to the invention includes a drying operation at 100° C. at ordinary pressures or a drying operation under reduced pressure at a correspondingly reduced temperature. If desired, an additional heat treatment at 120–140° C. can also be applied.

With the aid of the present invention, it is possible to fix silicones in an excellent manner onto materials of the most diverse kinds, such as, e.g., filaments, fabrics, leather, paper, or foils of natural or synthetic origin. Thus, e.g., silicone impregnations on textile materials exhibit a surprisingly high resistance to repeated laundering and to abrasion.

An especially advantageous mode of carrying out the process of the present invention consists in the additional use of substances which in aqueous solution show a practically neutral reaction at ordinary temperature, but are capable of forming alkaline products at higher temperatures. As examples there may be mentioned the alkali metal salts of trichloracetic acid and chiefly the salts of strong bases with organic acids which are volatile when heated, such as ammonium acetate, morpholine acetate and zinc acetate.

These substances are preferably used in an aqueous solution together with the reaction products obtained by the action of epoxide resins on di- and/or polyamines. The suitable proportions can easily be ascertained by preliminary experiments; in general, quantities of 0.5–2 g. per litre of aqueous solution of the reaction products will be used. The fixation of the silicones on the materials can thus be further improved.

The following examples serve to illustrate the invention without, however, limiting the scope thereof; the parts given are parts by weight.

EXAMPLE 1

A cotton fabric is padded according to the Foulard method in an aqueous liquor which contains, per litre, 75 g. of the silicone emulsion described below and 20 g. of the acetate of the reaction product described below. The fabric is squeezed to an increase in wet weight of 100%, and subsequently dried at 100° C. The hydrophobing effect attained on the fabric is very good and surprisingly resistant to laundering.

The aqueous silicone emulsion employed contained, per 100 parts, 25 parts of a mixture which consisted of equal parts of a hydroxy-end-terminated dimethyl polysiloxane with a viscosity of 18,000 cs. at 20° C. and of a methyl-hydrogen-polysiloxane with a viscosity of 15 cs. at 20° C. For the formation of the aqueous emulsion, use was made of an alkylaryl polyglycol ether obtained by the action of 350 parts of ethylene oxide on 220 parts of the reaction product of 50 parts of phenol and 170 parts of p-methylstyrol according to the process of copending application Serial Number 693,005, filed October 29, 1957 (now abandoned), which application is assigned to the same assignee as this case.

The reaction product employed in the form of its acetate was prepared by causing 100 parts of an epoxide resin, which was obtained from 2,2-bis-(p-hydroxyphenyl-propane and epichlorhydrin and which possesses an epoxide equivalent weight of 208, to react with 17.4 parts of $\gamma,\gamma'$-diaminopropyl-methylamine.

The proportion of acetate resin to polysiloxane in the foregoing composition is 1.06:1.

When in place of a cotton fabric, a fabric from polyamide or polyester fibres is treated in the specified manner, the hydrophobing effect is also very good and surprisingly resistant to laundering.

In the following Tables I and II, the hydrophobing effects attainable on cotton and polyacrylonitrile fabrics, respectively, according to the procedure of Example 1 are contrasted with the effects obtained by applying silicones together with polyalkylene-polyamines according to a known process. In addition to the 75 g. of the silicone emulsion specified in Example 1 there were used per litre of liquor, 20 g. of the acetate of the reaction product there specified, or 20 g. of the acetate of the polyethylene-polyamine to be used for comparison. The determination of the hydrophobing effect was carried out with a Bundesmann apparatus.

*Table I*

| Additive used | Water absorption per 100 g. of cotton fabric | |
|---|---|---|
| | Before laundering | After laundering 5 times in soap |
| Acetate of reaction product of Example 1 | 13 | 27 |
| Acetate of tetraethylene-pentamine | 38 | 57 |

*Table II*

| Additive used | Water absorption per 100 g. of polyacrylonitrile fabric | |
|---|---|---|
| | Before laundering | After laundering 5 times in soap |
| Acetate of reaction product of Example 1 | 5 | 5 |
| Acetate of tetraethylene-pentamine | 23 | 28 |

EXAMPLE 2

The procedure is carried out as described in Example 1 but in place of the aqueous silicone emulsion indicated therein, an aqueous silicone emulsion is used which contained, per 100 parts, 24 parts of a hydroxy-end-terminated dimethyl-polysiloxane with a viscosity of 18,000 cs. at 20° C. and 4 parts of a methyl-hydrogen-polysiloxane with a viscosity of 15 cs. at 20° C. The proportion of acetate resin to polysiloxane was 0.95:1.

The hydrophobing effect attained on the fabric is also very good and surprisingly resistant to laundering.

EXAMPLE 3

The procedure is carried out as described in Example 1, but instead of the acetate of the reaction product indicated therein, the acetate of a product is used which is prepared by the action of 100 parts of the epoxide resin mentioned in Example 1 upon 10.5 parts of $\gamma,\gamma'$-diaminopropylmethylamine and available in the form of a 15% aqueous dispersion. A very good hydrophobing effect is again obtained on the treated fabric which is resistant to laundering. The proportion of acetate resin to polysiloxane in this Example was 1.06:1.

EXAMPLE 4

A fabric from polyacrylonitrile fibres is treated at 45° C. for 30 minutes at a goods-to-liquor ratio of 1:20 in an aqueous bath which contains, per litre, 5 g. of the aqueous silicone emulsion indicated in Example 1 and 0.5 g. of the acetate of the reaction product there specified. The fabric is subsequently dried at 90° C. The hydrophobing effect attained on the fabric is very good, and has excellent resistance towards laundering with soap. The proportion of acetate resin to polysiloxane in this example was 0.4:1.

EXAMPLE 5

A cotton fabric is padded according to the Foulard method in an aqueous liquor which contains, per litre, 50 g. of the acetate of a reaction product prepared by the action of 100 parts of the epoxide resin specified in Example 1 upon 12.4 parts of diethylenetriamine. The fabric is squeezed to an increase in wet weight of 100%, and subsequently dried at 100° C. Thereafter, the fabric is further padded in a liquor which contains, per litre, 75 g. of the silicone emulsion specified in Example 1, and is then again dried at 100° C. The hydrophobing effect is again very good, and has excellent resistance towards washing. The proportion of acetate resin to polysiloxane was 2.66:1.

EXAMPLE 6

A cotton fabric is padded according to the Foulard process in an aqueous liquor containing per litre 1.5 g. of zinc acetate in addition to 75 g. of the aqueous silicone solution described in Example 1 and to 20 g. of the acetate of the reaction product mentioned in Example 1. The proportion of acetate resin to polysiloxane was 1.06:1. Subsequently the fabric is squeezed to 100% increase of wet weight and then dried at 100° C.

Upon spraying on a Bundesmann apparatus for 10 minutes, the fabric shows a water adsorption of 8% of the weight of the material and a water-repellent effect of 10 minutes.

EXAMPLE 7

A polyacrylonitrile fabric is treated according to the instructions of Example 6, but with the difference that the aqueous liquor contains 2 g. of the sodium salt of trichloracetic acid per litre, instead of zinc acetate. The proportion of acetate resin to polysiloxane was 1.06:1.

Upon spraying on a Bundesmann apparatus for 10 minutes, the fabric shows a water adsorption of 6.5% of the weight of the material and a water-repellent effect of 10 minutes.

If instead of the sodium acetate of trichloracetic acid there is used the same amount of ammonium acetate or morpholine acetate, spraying of the treated fabric on the Bundesmann apparatus likewise yields excellent values for the hydrophobing and water-repellent effect.

We claim:
1. An improved process of fixing a water-repellent silicone impregnation to the surface of a textile so as to make the impregnation resistant to repeated laundering and abrasion which comprises impregnating the textile with (1) a silicone selected from the group consisting of methyl-hydrogen-polysiloxane and dimethyl-polysiloxane, and (2) a resin prepared by reacting any epoxy resin with an alkylene polyamine containing at least two reactive hydrogen atoms in such proportions that 1–3 epoxide groups are employed for each of said reactive hydrogen atoms, the proportion of said resin to the polysiloxane being about 0.4–2.7:1, and subsequently drying the impregnated textile.

2. The process of claim 1 wherein the textile is treated with said alkyl polysiloxane after impregnation with said resin.

3. The process of claim 1 wherein said resin is employed in the form of a water-soluble salt of a readily volatilized organic acid.

4. The process of claim 1 wherein said resin is applied in the form of an aqueous emulsion.

5. The process of claim 1 wherein the impregnation also includes a salt which exhibits a practically neutral reaction in aqueous solutions at ordinary temperatures but is capable of exerting an alkaline effect at elevated temperatures, said salt being selected from the group consisting of ammonium acetate, zinc acetate, morpholine acetate, and alkali metal salts of trichloroacetic acid.

6. A textile impregnated with at least one silicone selected from the group consisting of methyl-hydrogen-polysiloxane and dimethyl-polysiloxane, and (b) the resin obtained by reacting an epoxy resin with an alkylene polyamine containing at least two reactive hydrogen atoms in proportions such that 1–3 epoxide groups are employed for each reactive hydrogen atom of the polyamine, the aforesaid polysiloxane and resin being employed in a ratio of about 0.4–2.7:1, whereby the resulting silicone impregnation exhibits high resistance to repeated laundering and abrasion.

References Cited by the Examiner

UNITED STATES PATENTS

| | | | |
|---|---|---|---|
| 2,324,483 | 7/43 | Castan | 117—161 |
| 2,588,365 | 3/52 | Dennett | 117—161 |
| 2,723,924 | 11/55 | Mackinney | 117—161 |
| 2,758,946 | 8/56 | Spalding et al. | 117—161 |
| 2,772,248 | 11/56 | Liberman et al. | 260—47 XR |
| 2,774,690 | 12/56 | Dennett et al. | 117—161 XR |
| 2,865,888 | 12/58 | Greenlee | 260—47 |
| 2,946,701 | 7/60 | Plueddeman | 117—161 |

WILLIAM D. MARTIN, *Primary Examiner.*

RICHARD D. NEVIUS, *Examiner.*